United States Patent Office 3,145,574
Patented Aug. 25, 1964

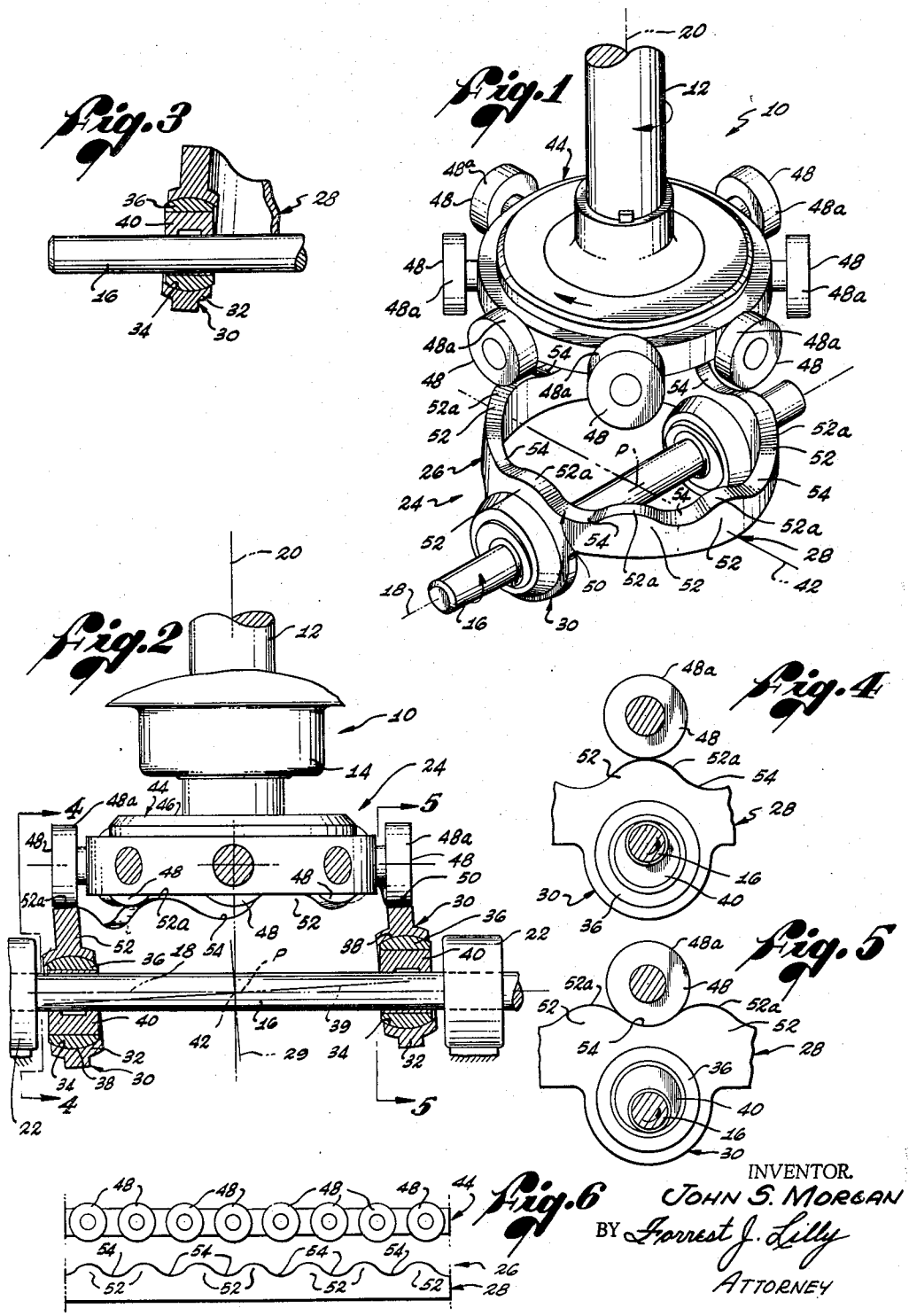

3,145,574
ROTARY REACTION TRANSMISSION
John S. Morgan, Lynwood, Calif., assignor to Western Gear Corporation, Lynwood, Calif., a corporation of Washington
Filed May 3, 1962, Ser. No. 192,099
8 Claims. (Cl. 74—63)

This invention relates generally to mechanical power transmissions and, particularly, to an improved rotary reaction transmission for transmitting rotary motion between two angularly disposed shafts.

Briefly, the invention provides a rotary transmission having a rotary driving shaft, a rotary driven shaft coplanar with and disposed at an angle to the driving shaft, and a rotary reaction drive mechanism for transmitting rotary motion from the driving shaft to the angularly disposed driven shaft. This drive mechanism includes a rotary driven reaction cage drivably coupled to the driven shaft and provided with a coaxial, circular row of axially projecting, convexly curved reaction drive surfaces and an oscillatory driving reaction cage provided with a circular row of axially extending, convexly curved reaction drive surfaces which are coaxial with and mesh with the reaction drive surfaces on the driven cage in a limited zone of driving engagement along said rows. The driving shaft is drivably coupled to the driving cage in such a way as to synchronously drive the latter with a rotary oscillatory motion about the axis of the driven shaft and with a rocking motion about an axis transverse to the axes of both the driving and driven shafts and parallel to a plane of tangency to the reaction surfaces on the latter cage. The number of reaction drive surfaces of the driving cage is different from the number of reaction drive surfaces on the driven cage.

During operation of the transmission, the compound oscillatory-rocking motion imparted to the driving cage causes the zone of engagement of the reaction surfaces to progress around the reaction cages in such a way that the reaction surfaces on the driving cage successively engage between successive adjacent reaction surfaces on the driven cage. This progression of the zone of reaction surface engagement around the cages introduces a further synchronous rocking motion, about the axis of the driving shaft, into the compound oscillatory-rocking motion of the driving cage produced directly by rotation of the driving shaft. The net resultant motion of the driving cage, produced by the three synchronous motions described above, is a compound wobble and rotary oscillatory motion in which the driving cage wobbles about a center located along the axis of the driven shaft and synchronously oscillates about this latter axis.

Because of the difference in the number of teeth on the two cages, an interference, wedging, or camming action occurs during each successive engagement of a driving cage reaction surface between two adjacent driven cage reaction surfaces. This interference produces a torque in one direction on the driven cage. An additional torque in this direction is produced by the rotary oscillatory motion of the driving cage. The total torque thus exerted on the driven cage rotates the latter, and the driven shaft connected thereto, in the corresponding direction.

With this preliminary discussion in mind, a general object of the invention may be stated as being to provide a new and useful rotary reaction transmission for transmitting rotary motion from a driving shaft to an angularly disposed driven shaft.

Another object of the invention is to provide a transmission of the character described in which rotary motion is transmitted from the driving shaft to the driven shaft without gearing or other rotary power transmission elements commonly used for this purpose and with a minimum of sliding surfaces so that friction losses and lost motion are kept at a minimum.

Yet another object of the invention is to provide a transmission of the character described in which all major loads in the transmission are carried by compression members and shear and bending stresses are almost completely eliminated.

A further object of the invention is to provide a transmission of the character described which is capable of a high speed ratio without the use of small, highly loaded members such as exist in a gear-to-gear or worm-to-gear transmisison.

Yet a further object of the invention is to provide a transmission of the character described which is relatively simple in construction, reliable in operation, immune to wear, and otherwise ideally suited to its intended purposes.

Other objects, advantages, and features of the invention will become readily apparent as the description proceeds.

A presently preferred embodiment of the invention will now be described by reference to the attached drawing, wherein:

FIG. 1 is a perspective view of the transmission with the reaction cages thereof separated for clarity of illustration;

FIG. 2 is a view in side elevation, partially in section, of the transmission of FIG. 1 showing the reaction cages thereof in one position of operative engagement;

FIG. 3 is a section through one of two driving shaft eccentrics which are used in the transmission of FIG. 1 to drive the driving cage in its compound wobble and rotary oscillatory motion;

FIG. 4 is a section taken on line 4—4 in FIG. 2;

FIG. 5 is a section taken on line 5—5 in FIG. 2; and

FIG. 6 illustrates the reaction surfaces on the driving and driven cages laid out flat in the relative angular positions which they occupy in FIG. 2.

The transmission 10 illustrated in this drawing comprises a rotary driven shaft 12 which is rotatably supported and axially restrained by a bearing 14 (omitted in FIG. 1 for the sake of clarity). The driving shaft 16 of the transmission extends past one end of and at right angles to the driven shaft 12. The rotation axis 18 of the driving shaft 16 is approximately coplanar with the rotation axis 20 of the driven shaft 12. Driving shaft 16 is supported in bearings 22 (omitted in FIG. 1 for the sake of clarity) and is driven from any suitable power source, not shown.

Operatively connecting the driven shaft 12 to the driving shaft 16 is a rotary reaction drive mechanism 24. This mechanism comprises a driving reaction cage 26, shown as comprising a cam ring 28. Cam ring 28 is centered on the rotation axis 20 of the driven shaft 12 and has a central axis 29. At diametrically opposite sides of the cam ring 28 are spherical, self-aligning bearings 30. Each bearing 30 includes an outer part 32, rigid on the cam ring and formed with an internal spherically curved bearing surface 34, and an inner bearing part 36, formed with an external spherically curved bearing surface 38 engaging the respective bearing surface 34. Inner bearing parts 36 are, therefore, universally swiveled in the outer bearing parts 32. Bearing surfaces 34 in the outer bearing parts 32 are disposed on a common axis 39 parallel to the plane of the cam ring 28.

Keyed to the driving shaft 16 are two rotary eccentrics 40. These eccentrics are fixed within the inner, swiveled bearing parts 36, respectively, as shown. Eccentrics 40 are relatively angularly displaced 180° on the driving shaft 16.

From this description, it is evident that when the eccentrics 40 are rotated in unison by rotation of the driving shaft 16, they impart to the driving cage 26 and its cam ring 28 an oscillatory motion about the axis 20 of the driven shaft and a simultaneous rocking motion approximately about an axis 42 normal to the axes 18 and 20 of the driving and driven shafts. As will be seen shortly, during actual operation of the transmission, the driving cage 26 also rocks from side to side about the axis 18 of the driving shaft. The several axes 18, 20 and 42 intersect at a point P along the axis 20 of the driven shaft 12. The several motions of the driving cage described above give the latter a resultant wobble motion about the point P and a simultaneous oscillatory motion about the driven shaft axis 20, as will be discussed further at a later point.

Mounted on and drivably coupled to the driven shaft 12 is a driven reaction cage 44. This cage is shown as comprising a disc 46 keyed on the shaft 12 and mounting a plurality of reaction rollers 48 about its periphery. Reaction rollers 48 are uniformly spaced about the reaction cage 44 and have their rotation axes extending radially of the driven shaft.

Cam ring 28 has an undulated cam surface 50 engaged by the reaction rollers 48. Cam surface 50 is defined by a plurality of alternate, arcuate cam lobes 52 and cam recesses 54 which are uniformly spaced about the cam ring. The number of cam lobes 52 is different from the number of reaction rollers 48. In the illustrated transmission, for example, there are seven cam lobes 52 and eight cam rollers 48.

In the present transmission, the cylindrical surfaces 48a of the reaction rollers 48 serve as convexly curved, axially extending reaction surfaces on the driven reaction cage 44. Similarly, the arcuate surfaces 52a of the cam lobes 52 serve as convexly curved, axially extending reaction surfaces on the driving reaction cage 26. For this reason, the surfaces 48a and 52a will be hereinafter referred to as reaction surfaces. It will become evident as the description proceeds that these reaction surfaces can be provided in ways other than those illustrated.

In the illustrated transmission, the reaction surfaces 48a on the driven cage 44 are of an even number and, therefore, arranged in pairs of diametrically opposed reaction surfaces. The reaction surfaces 52a on the driving reaction cage 26 are of an odd number and, therefore, arranged with a recess 54 diametrically opposite each reaction surface 52a. When the driving and driven reaction cages are placed in operative position, then the driving cage 26 is rocked to a definite angular position about the driving shaft by contact of its reaction surfaces 52a with the reaction surfaces 48a on the driven cage 44.

The particular angular position which the driving cage assumes is dependent on the relative angular positions of the cages on the axis 20 of the driven shaft 12. In the illustrated transmission, for example, wherein one reaction surface 52a on the driving cage 26 is centered directly over the common axis 39 of the outer self-aligning bearing parts 32, the driving cage assumes a position in which the aforementioned plane of the cam ring, or a plane tangent to the high points of its reaction surfaces 52a, is normal to the plane of the shafts 12 and 16 but slopes down in one axial direction of the driving shaft when the cages are relatively angularly positioned, as in FIG. 2. In this illustrated relative angular position of the cages, the right-hand (as the transmission is viewed in FIG. 2) reaction surface 48a on the driven cage engages between the two adjacent reaction surfaces 52a on the driving cage, as shown best in FIG. 5. The left-hand reaction surface 48a on the driven cage is centered over the left-hand reaction surface 52a on the driving cage which is directly over the self-aligning bearing axis just referred to, as shown best in FIG. 4. The intervening reaction surfaces are disposed in the various intermediate positions of engagement shown in FIGS. 2 and 6 and rigidly retain the driving cage 26 in the position shown. In the position of FIG. 2, the left-hand eccentric 40 occupies its lowermost position and the right-hand eccentric occupies its uppermost position, as may best be observed in FIGS. 4 and 5.

During operation of the transmission, the driving shaft is rotated to rotate the eccentrics 40 in unison and thereby produce the aforedescribed compound oscillatory-rocking motion of the driving cage 26. This compound motion of the driving cage causes the reaction surfaces 52a thereon to be successively forced against the reaction surfaces 48a on the driven cage 44 with a compound axial and rotational motion. Because of the difference in the number of reaction surfaces on the two cages, an interference or camming action occurs between the reaction surfaces during this successive engagement thereof which creates a torque on the driven cage that rotates the latter, and the driven shaft 12, in one direction. As the two cages rotate with respect to one another, their reaction surfaces ride over one another causing the driving cage to rock from side to side about the axis 18 of the driving shaft, as mentioned earlier.

The resultant motion of the driving cage 26, therefore, is a compound wobble motion about the point P in FIG. 2 and oscillatory motion about the driven shaft axis 20. This resultant compound motion of the driving cage 26 results in successive driving engagement of the reaction surfaces 52a on the driving cage 26 with the reaction surfaces on the driven cage 44 and creates a total driving torque on the driven cage 44 that is due in part to the oscillatory motion of the driving cage about the driven shaft axis, in part to the rocking motion of the latter cage on the axis 42, and in part to the rocking motion of the latter cage on driving shaft axis 18. Thus, the reaction surfaces on the driving cage are periodically and successively thrust against the reaction surfaces on the driven cage with a component of rotary motion, due to the oscillatory component of the driving cage, and thereby push the driven cage around in one direction of rotation on its axis 20. The driving reaction surfaces on the driving reaction cage are simultaneously thrust axially against the reaction surfaces on the driven reaction cage by the compound rocking or wobble motion of the driving cage. This produces an additional interference or camming action between the surfaces that cams the driven cage around in said one direction of rotation. The driven cage 44 and driven shaft 12 are thereby driven in rotation by the combined action of the rotary oscillatory motion of the driving cage and the wobble motion of the latter cage.

In the transmission illustrated, wherein there are seven reaction surfaces 52a on the driving cage and eight reaction surfaces 48a on the driven cage, seven revolutions of the driving shaft 16 are required to produce one revolution of the driven shaft 12. In other words, the illustrated transmission has a reduction ratio of 7 to 1. It is obvious that this speed ratio can be changed by varying the number of reaction surfaces on the cages. The direction of rotation of the driven shaft can be reversed, of course, by reversing the direction of rotation of the driving shaft.

It is obvious that the positions of the reaction rollers 48 and cam ring 28 in the illustrated transmission could be reversed. That is to say, the cam ring 28 could be carried on the driven cage 44 and the reaction rollers 48 could be carried on the driving cage 26. Other modifications are, of course, also possible.

Clearly, then, the invention herein described and illustrated is fully capable of attaining the objects and advantages preliminarily set forth.

What is claimed is:

1. A rotary reaction transmission comprising a rotary axially restrained driven shaft, a driven reaction cage fixed on said shaft including a coaxial circular row of first convexly curved, axially facing reaction surfaces uniformly spaced about the axis of said shaft, a driving reaction cage opposite said driven cage including a circular row of second convexly curved, axially facing reaction surfaces uniformly spaced about said axis and axially engaging said first reaction surfaces, respectively, said row of second reaction surfaces being centered on said driven shaft axis and the number of said first reaction surfaces being different from the number of said second reaction surfaces, a driving shaft, and coacting means on said driving shaft and driving cage for driving the latter cage with a compound motion involving a universal wobble motion of the latter cage with respect to the driving shaft approximately about a center along said driven shaft axis and a synchronous oscillatory motion of the latter cage about said driven shaft axis, all in such manner that said second reaction surfaces are successively thrust against successive first reaction surfaces with an axial component of motion generally parallel to said driven shaft axis and with a rotary component of motion in one direction about the latter axis, whereby said driven cage and shaft are driven in one direction of rotation by the interference between the successively engaging reaction surfaces and by the torque exerted directly on the successively engaged first reaction surfaces from their respective engaging second reaction surfaces.

2. A rotary reaction transmission comprising a rotary axially restrained driven shaft, a driven reaction cage fixed on said shaft including a coaxial circular row of first convexly curved, axially facing reaction surfaces uniformly spaced about the axis of said shaft, a driving reaction cage opposite said driven cage including a circular row of second convexly curved, axially facing reaction surfaces uniformly spaced about said axis and axially engaging said first reaction surfaces, respectively, said row of second reaction surfaces being centered on said driven shaft axis and the number of said first reaction surfaces being different from the number of said second reaction surfaces, a driving shaft transverse to and approximately coplanar with the driven shaft, rotary eccentric means driven by said driving shaft and arranged to drive said driving cage with a compound motion involving a wobble motion of the latter cage approximately about a center along said driven shaft axis and a synchronous oscillatory motion of the latter cage about said driven shaft axis, all in such manner that said second reaction surfaces are successively thrust against successive first reaction surfaces with an axial component of motion generally parallel to said driven shaft axis and with a rotary component of motion in one direction about the latter axis, whereby said driven cage and shaft are driven in one direction of rotation by the interference between the successively engaging reaction surfaces and by the torque exerted directly on the successively engaged first reaction surfaces from their respective engaging second reaction surfaces.

3. A rotary reaction transmission comprising a rotary axially restrained driven shaft, a driven reaction cage fixed on said shaft including a coaxial circular row of first convexly curved, axially facing reaction surfaces uniformly spaced about the axis of said shaft, a driving reaction cage opposite said driven cage including a circular row of second convexly curved, axially facing reaction surfaces uniformly spaced about said axis and axially engaging said first reaction surfaces, respectively, said row of second reaction surfaces being centered on said driven shaft axis and the number of said first reaction surfaces being different from the number of said second reaction surfaces, a pair of rotary eccentrics at diametrically opposite sides of said row of second reaction surfaces and displaced 180° on a common axis of rotation transverse to and intersecting said driven shaft axis, means for driving said eccentrics in unison, universal bearing means rotatably mounting said driving cage on said eccentrics so that when said eccentrics are driven in rotation, said driving cage is driven in a compound motion involving a wobble motion of the latter cage approximately about a center along said driven shaft axis and a synchronous oscillatory motion of the latter cage about said driven shaft axis, all in such manner that said second reaction surfaces are successively thrust against successive first reaction surfaces with an axial component of motion generally parallel to said driven shaft axis and with a rotary component of motion in one direction about the latter axis, whereby said driven cage and shaft are driven in one direction of rotation by the interference between the successively engaging reaction surfaces and by the torque exerted directly on the successively engaged first reaction surfaces from their respective engaging second reaction surfaces.

4. A rotary reaction transmission comprising a rotary axially restrained driven shaft, a driven reaction cage fixed on said shaft including a coaxial circular row of first convexly curved, axially facing reaction surfaces uniformly spaced about the axis of said shaft, a driving reaction cage opposite said driven cage including a circular row of second convexly curved, axially facing reaction surfaces uniformly spaced about said axis and axially engaging said first reaction surfaces, respectively, said row of second reaction surfaces being centered on said driven shaft axis and the number of said first reaction surfaces being different from the number of said second reaction surfaces, a pair of rotary eccentrics at diametrically opposite sides of said row of second reaction surfaces and displaced 180° on a common axis of rotation transverse to and intersecting said driven shaft axis, means for driving said eccentrics in unison, universal swivel bearing means rotatably mounting said driving cage on said eccentrics so that when said eccentrics are driven in rotation said driving cage is driven in a compound motion involving a wobble motion of the latter cage approximately about a center along said driven shaft axis and a synchronous oscillatory motion of the latter cage about said driven shaft axis, all in such manner that said second reaction surfaces are successively thrust against successive first reaction surfaces with an axial component of motion generally parallel to said driven shaft axis and with a rotary component of motion in one direction about the latter axis, whereby said driven cage and shaft are driven in one direction of rotation by the interference between the successively engaging reaction surfaces and by the torque exerted directly on the successively engaged first reaction surfaces from their respective engaging second reaction surfaces.

5. A rotary reaction transmission comprising a rotary axially restrained driven shaft, a driven reaction cage fixed on one end of said shaft including a coaxial circular row of first convexly curved, axially facing reaction surfaces uniformly spaced about the axis of the shaft, a rotary driving shaft extending past said one end of said driven shaft with the axis of the driving shaft transverse to and intersecting the axis of the driven shaft, a driving reaction cage opposite said one end of the shaft and said driven cage thereon including a circular row of second convexly curved, axially facing reaction surfaces axially engaging said first reaction surfaces, respectively, said row of second reaction surfaces being centered on said driven shaft axis and the number of said first reaction surfaces being different from the number of said second reaction surfaces, and means supporting said driving cage on and operatively connecting the latter cage to said driving shaft for driving of said latter cage by rotation of the driving shaft and with a compound motion involving a wobble motion of the latter cage approximately about a center along said driven shaft axis and with a synchronous oscillatory motion of the latter cage about said driven shaft axis, all in such manner that said second reaction surfaces are successively thrust against successive first reaction surfaces with an axial component of motion generally parallel to said driven shaft axis and with a rotary component of motion in one direction about the latter axis, whereby said driven cage and shaft are driven in one direction of rotation by the interference between the successively engaging reaction surfaces and by the torque exerted directly on the successively engaged first reaction surfaces from their respective engaging second reaction surfaces.

6. A rotary reaction transmission comprising a rotary axially restrained driven shaft, a driven reaction cage fixed on one end of said shaft including a coaxial circular row of first convexly curved, axially facing reaction surfaces uniformly spaced about the axis of the shaft, a rotary driving shaft extending past said one end of said driven shaft with the axis of the driving shaft transverse to and intersecting the axis of the driven shaft, a driving reaction cage opposite said one end of the shaft and said driven cage thereon including a circular row of second convexly curved, axially facing reaction surfaces axially engaging said first reaction surfaces, respectively, said row of second reaction surfaces being centered on said driven shaft axis and the number of said first reaction surfaces being different from the number of said second reaction surfaces, a pair of eccentrics fixed on said driving shaft at diametrically opposite sides of said row of second reaction surfaces and displaced 180° on the latter shaft, and universal swivel bearing means rotatably supporting said driving cage on said eccentrics so that when said driving shaft is rotated said driving cage is driven in a compound motion involving a wobble motion of the latter cage approximately about a center along said driven shaft axis and a synchronous oscillatory motion of the latter cage about said driven shaft axis, all in such manner that said second reaction surfaces are successively thrust against successive first reaction surfaces with an axial component of motion generally parallel to said driven shaft axis and with a rotary component of motion in one direction about the latter axis, whereby said driven cage and shaft are driven in one direction of rotation by the interference between the successively engaging reaction surfaces and by the torque exerted directly on the successively engaged first reaction surfaces from their respective engaging second reaction surfaces.

7. The subject matter of claim 6, wherein one of said reaction cages comprises a cam ring having an undulated cam surface defining said reaction surfaces on said one cage and the other reaction surfaces comprise the cylindrical surfaces of rollers rotatably mounted on the other cage.

8. A rotary reaction transmission comprising a first rotary axially restrained shaft, a first reaction cage fixed on said shaft including a coaxial circular row of first convexly curved, axially facing reaction surfaces uniformly spaced about the axis of said shaft, a second reaction cage opposite said first cage including a circular row of second convexly curved, axially facing reaction surfaces uniformly spaced about said axis and axially engaging said first reaction surfaces, respectively, said row of second reaction surfaces being centered on said shaft axis and the number of said first reaction surfaces being different from the number of said second reaction surfaces, a second shaft transverse to and approximately coplanar with said first shaft, a pair of eccentrics fixed on said second shaft at diametrically opposite sides of said second cage and displaced 180° with respect to one another about the axis of said second shaft, and universal bearing means on said second cage at said diametrically opposite sides of the latter cage rotatably supporting the latter on said eccentrics.

References Cited in the file of this patent
UNITED STATES PATENTS

| | | |
|---|---|---|
| 1,353,063 | Nutt | Sept. 14, 1920 |
| 1,760,867 | Bennett | June 3, 1930 |
| 2,199,682 | Travnicek | May 7, 1940 |
| 2,322,539 | Nowka | June 22, 1943 |